United States Patent [19]

Grey

[11] Patent Number: 4,582,566

[45] Date of Patent: Apr. 15, 1986

[54] ARTICLE DIE FORMING METHOD

[75] Inventor: George E. Grey, Victoria, Australia

[73] Assignee: Craigave Pty. Ltd., Mount Dandenong, Australia

[21] Appl. No.: 643,376

[22] Filed: Aug. 23, 1984

[30] Foreign Application Priority Data

Aug. 30, 1983 [AU] Australia .................. PG1136

[51] Int. Cl.⁴ .......................... C23F 1/02; B44C 1/22; C03C 15/00; C03C 25/06
[52] U.S. Cl. .................. 156/651; 156/659.1; 156/661.1; 156/905; 430/323
[58] Field of Search ............ 156/650, 651, 654, 659.1, 156/661.1, 664, 905, 656, 658; 430/300, 322, 323

[56] References Cited

U.S. PATENT DOCUMENTS 2,854,336  9/1958  Gutknecht ............... 156/650 X
4,294,650 10/1981  Werthmann ............ 156/661.1 X
4,325,779  4/1982  Rossetti .................. 156/661.1 X

*Primary Examiner*—William A. Powell
*Attorney, Agent, or Firm*—Sheridan Neimark; Karl W. Flocks

[57] ABSTRACT

A method of etching a surface of a metal object to obtain an etch pattern having a plurality of etch depths. The surface is provided with a first etch resistant coating so that at least one first designated surface region remains uncoated and the surface is then subjected to the action of an etching solution to etch the first designated surface region and thereby provide a first pattern part. The etched surface is subsequently provided with a second etch resistant coating so that at least one second designated region thereof remains uncoated, and the surface is then subjected to the action of an etching solution to etch the second designated surface region and thereby provide a second pattern part. At least one of each of the first and second designated regions overlap each other so that the surface is double etched within those regions.

8 Claims, 5 Drawing Figures

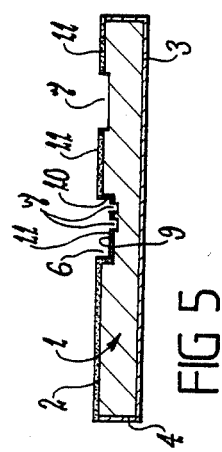
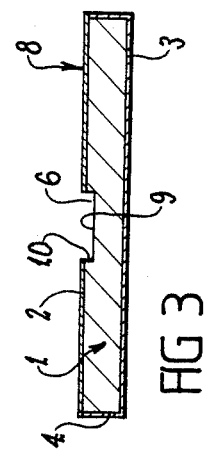
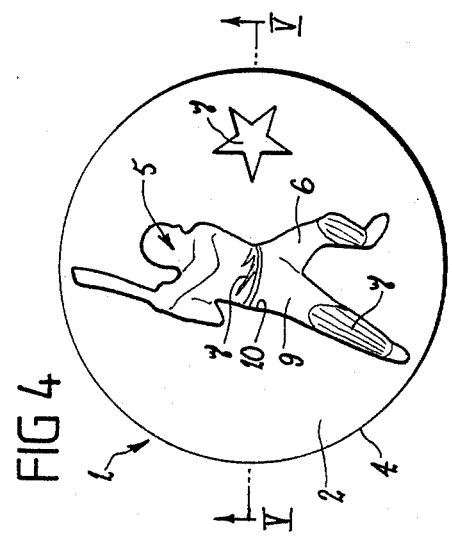
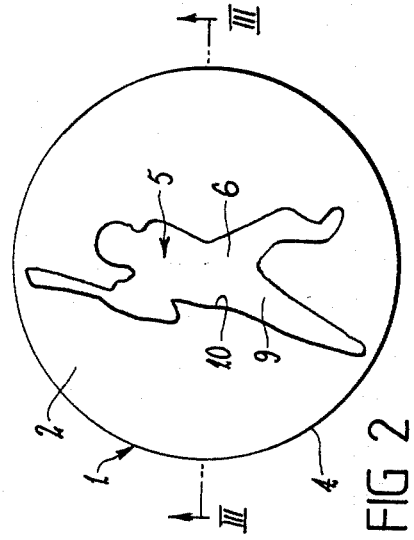
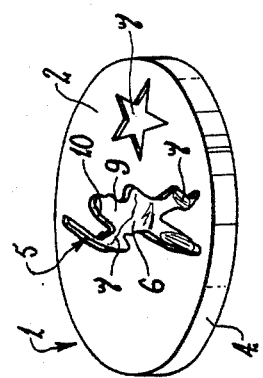

ARTICLE DIE FORMING METHOD

This invention relates generally to a method of etching a surface of a metal object to obtain a desired etch pattern and also the metal object so prepared. That method is applicable in preparing a die part in which is provided a negative of subject matter which can be applied to a surface of an article during article production using the die part. The resultant die part may be particularly useful in the production of plate-like articles such as coins and medallions or parts thereof, having a pattern or ornamentation in relief on at least one surface thereof. It will be convenient to hereinafter describe the invention in relation to this application although it is to be appreciated that the method and die part of the invention are not limited to that exemplary application.

It is well known to produce articles such as coins and medallions having subject matter formed in relief on or incised into at least one surface thereof. Those articles may be molded or cast from a plastics or metal material using ferrous, such as steel, or non-ferrous, such as zinc, die parts arranged together to define a chamber in which the articles are molded or cast. For producing those articles, die parts are prepared in which a "negative" image of the subject matter is formed on a die face so that, for example, for relieved subject matter an image of that subject matter is incised into the die face.

The subject matter image has in the past been formed by an engraving process and that is satisfactory for forming both shallow and deep images on the die face. However, that process requires considerable professional skill in accurately preparing the die parts. In addition, the process is time consuming. In that regard, it is not uncommon for die parts to be weeks in preparation. As a result, die part preparation and thus article cost, is relatively expensive.

In an effort to alleviate these disadvantages, etching processes have been developed for forming the subject matter image. Whilst these processes enable relatively rapid and inexpensive die preparation they have generally only been successful in shallow die image formation. For deep images the die etching has been difficult to control so that details of the image often do not form precisely. That can be so even where the die face being etched is progressively unmasked to enable staged etching. Thus, to date these etching processes have had a limited use in die part preparation.

It is an object of the present invention to alleviate these disadvantages through the provision of a relatively simple metal object surface etching method, which may be particularly applicable in preparing a die part, and a metal object so prepared.

With that in mind, the present invention provides in one aspect a method of etching a surface of a metal object to obtain an etch pattern having a plurality of etch depths, including: providing the surface with a first etch resistant coating so that at least one first designated surface region remains uncoated; subjecting the surface to the action of an etching solution to etch the first designated surface region and thereby provide a first pattern part; providing the etched surface with a second etch resistant coating so that at least one second designated region thereof remains uncoated; and, subjecting the surface to the action of an etching solution to etch the second designated surface region and thereby provide a second pattern part; at least one of each of the first and second designated surface regions overlapping each other so that the surface is double etched within those regions.

In another aspect the present invention provides a metal object when prepared using the above method.

Preferably, etching of the first designated surface region at least partially deep etches the region. In that respect, the surface region is preferably at least partially etched to a depth beneath the surface of at least 0.030 of an inch.

Preferably, the etching of the second designated surface region shallow etches that region. Preferably, that etching etches the surface area region only to a depth of up to about 0.010 of an inch.

Preferably, provision of the first etch resistant coating involves a photographic technique. In that regard, preferably, a photographic transparency of the pattern, at least in part, is printed on the object surface and the surface is subsequently etched with an etching solution so that the non-printed region(s) of that surface are etched.

Preferably, the first etch resistant coating is provided by applying a light sensitive composition to the entire object surface. The composition, except that which coats the first designated surface region, is then preferably exposed to light. Subsequently, the unexposed composition is preferably removed from the first designated surface region to form the first coating.

The light sensitive composition may be a photographic emulsion. Thus, the first designated surface region to be etched may be photographed onto the surface so that the emulsion coating that first designated surface region remains unexposed. The unexposed emulsion may be removed by washing the surface in a photographic developer solution to reveal the first designated surface region.

Preferably, the second etch resistant coating is an etch resistant paint. That paint is provided manually by painting onto the object surface. The paint may be coated entirely over the object surface and then removed in the second surface region thereof. Alternatively, the paint may be selectively applied to the surface so as to leave the second surface region uncovered.

Either the etched or the unetched surface regions may be the negative of the subject matter to be applied to an article when the object is used as a die part. As will be apparent, that will depend on whether the subject matter is incised into or in relief on the article.

Preferably, etching of the surface during the etching processes is achieved using any suitable etching solution. The object is preferably placed in a bath of an acid solution for that etching. That solution, of course, should be compatible with the object material so that the acid solution selectively eats the object material during those processes.

The following description refers to a preferred embodiment of the various features of the method, and metal object prepared thereby, of the present invention. To facilitate an understanding of the invention, reference is made in the description to the accompanying drawings where a metal object is prepared by an embodiment of that method. It is to be understood that the method and metal object of the present invention is not limited to the preferred embodiment as described and illustrated in the drawings.

In the drawings:

FIG. 1 is a perspective view of a metal object prepared by a preferred embodiment method of the present invention;

FIG. 2 is a top plan view of the metal object of FIG. 1 partly prepared by the preferred embodiment method of the present invention;

FIG. 3 is a cross-sectional view through section III—III of FIG. 2;

FIG. 4 is a top plan view of the metal object of FIG. 1 further prepared by the preferred embodiment method of the present invention; and, FIG. 5 is a cross-sectional view through section V—V of FIG. 4.

Referring initially to FIG. 1, there is generally illustrated metal plate object 1, having opposed top and bottom surfaces 2,3, interconnected by peripheral edge surface 4. As previously indicated, this metal object 1, may conveniently form a die part to be prepared for applying subject matter to a surface of an article (not illustrated) during its production using that die part. Metal object 1, is composed of a non-ferrous metal such as magnesium or zinc. It will be appreciated that object 1, may be of any desirable shape. In providing a die part, object 1, may be disc-shaped and may be so shaped at any stage throughout the etching method of the present invention.

Top surface 2, has etch pattern 5, (schematically illustrated) of varying etch depths formed therein. As will be appreciated, this pattern 5, may be of any suitable arrangement having regard to the intended use of object 1. Thus, when used as a die part pattern 5, may be determined by the subject matter to be formed thereby on the surface of an article during its production. Etch pattern 5, may be from a natural subject such as a scene or person, and/or may be artwork either original or derived from a natural subject. As illustrated, etch pattern 5, may be the subject matter incised into object 1, so that the subject will be in relief on the article.

Utilising the method of the present invention, etch pattern 5, is achieved by subjecting top surface 2, to a first etching whereby at least one pattern part 6, is formed in top surface 2, and then subjecting top surface 2, to a second etching whereby at least one pattern part 7, is formed.

Thus, as illustrated in FIG. 1, etch pattern 5, of varying etch depths is achieved, with pattern part 7, being superimposed on and/or overlapping pattern part 6, so that there is at least some multiple etching of top surface 2.

Although not illustrated in FIG. 1, the first etching of the method is capable of etching one or more areas of top surface 2, to various depths. Thus, in this etching shallow as well as deep etching of region(s) of top surface 2, can be achieved in order to provide a true perspective image of etch pattern 5. The deep etching may form a block outline of etch pattern 5, whilst any shallow etching may form some fine detail of pattern 5. The first etching deep etches pattern part 6, to a first etch depth of at least about 0.030 of an inch and that depth may be between about 0.100 and 0.110 of an inch.

The second etching occurs at least partly in the region(s) of deep etching formed during the first etching. Thus, whilst at least one region of top surface 2, is double etched one or more other regions may be only single etched. The etching of the second etching may form fine detail, including fine line work on the block outline, of etch pattern 5. The second etching shallow etches pattern part 7, to a depth of up to about 0.010 of an inch and that depth may be between about 0.003 and 0.007 of an inch.

Referring now to FIGS. 2 to 5 of the drawings, a preferred embodiment of the method of the present invention will now be outlined.

Initially, a first etch resistant protective coating 8, is provided on unetched surfaces 2, 3, and 4, of die plate 1. At least on top surface 2, that is achieved through the use of generally known photographic techniques. In that regard, an unexposed light sensitive photographic emulsion is applied over entire top surface 2. A block outline or silhouette of pattern part 6, is then photographed onto that emulsion. To that end, a photograph is taken of subject matter that will eventually form etch pattern 5, and a positive film transparency of that subject matter prepared. As necessary, the subject matter on that transparency is blocked out to provide the subject matter outline or silhouette. The positive transparency is then arranged relative to top surface 2, within suitable photographic apparatus so that a light source exposes the transparency onto the emulsion. Because the subject matter is blocked out, the emulsion coating proposed pattern part 6, will remain unexposed to the light source. Top surface 2, is then washed in a photographic developer solution, such as by immersing object 1, therein. That immersion develops exposed regions of the photographic emulsion to provide protective coating 8, whilst the region(s) of top surface 2, in which pattern part 6, is to be etched is laid bare.

Object 1, is then fixed within an acid etching bath for the first etching. That fixing is such that top surface 2, is washed continuously with an etching solution so as to etch pattern part 6, to the desired depth. In one example of this embodiment, a magnesium plate object 1, is used, and the etching solution comprises nitric acid in an active amount of about 14% by volume of the solution, with about 5% by volume of oil, and the balance to 100% by volume water. The oil is included within the solution to inhibit undercut beneath coating 8, during etching, and may be "X-5K EXPRESS" oil. The first etching may proceed, in this example, for between about 5 to 15 minutes, depending upon the quality of the etching solution and the desired depth of etch, although should be conducted without interruption so as to avoid object undercut beneath coating 8.

Object 1, is then removed from the etching bath and washed clean of any residual etching solution and also to clean top surface 2, of coating 8. That washing can take place under running water. Object 1, will then appear as illustrated in FIGS. 2 and 3 of the drawings. In that regard, pattern part 6, is provided in top surface 2, and generally has bottom surface 9, and peripheral side surface 10, extending perpendicularly between top surface 2, and bottom surface 9.

Surfaces 2, 9, and 10, of pattern part 6, are then provided with second etch resistant protective coating 11. Coating 11, is conveniently an etch resistant paint that is manually painted onto surfaces 2, 9, and 10, so that eventually one or more regions thereof that will provide pattern part 7, remains uncoated. Protective coating 11, may be a paint marketed under the name RESISTAL. Protective coating 11, may be painted entirely over surfaces 2, 9, and 10, and then removed from regions thereof by suitable etching instruments, such as etching needles. Alternatively, that coating 11, may be applied selectively to surfaces 2, 9, and 10, so as to leave uncovered regions on which pattern parts 7, are to be formed.

Object 1, is then again placed in an acid etching bath. That bath may contain a quantity of still etching solution and object 1, may be manually agitated within that solution to cause etching of pattern part 7. In the one example of this embodiment, the etching solution comprises nitric acid in an active amount of about 6% by volume of the solution, with the balance to 100% by volume being water. Immersion within the etching solution may be for a period of between about 10 to 12 minutes depending upon the etching solution quality and the desired depth of etch of pattern part 7. During this second etching, object 1, may be periodically removed from the etching solution for checking on progress of the etch.

Upon completion of the etching of pattern part 7, object 1, is finally removed from the etching solution and any residual etching solution washed therefrom such as under running water. Object 1, will then appear as illustrated in FIGS. 4 and 5.

Subsequently object 1, may be cleaned of all protective coatings 8, and 11, and generally given a polished surface finish. That may be achieved by washing die plate 1, in methylated spirits to remove protective coating 11, and rubbing surfaces of object 1, with cotton wool or like material dipped in the second etching solution may provide those surfaces with a polished finish.

The method of the present invention enables deep yet detailed etching of patterns into surfaces. Thus, with this method it is possible to produce die parts for producing articles having subject matter on at least one surface thereof which is both detailed and which is in heavy relief on or heavily incised into that surface.

The method according to the present invention enables rapid and inexpensive preparation of metal objects having patterns etched into a surface thereof, so that the preparation of die parts for use in producing articles may be both rapid and inexpensive. As such, costs of articles produced from that die part may be minimised.

It is to be understood that various modifications and/or alterations may be made to the method of the present invention without departing from the ambit of the claims appended hereto.

Having now described my invention, what I claim as new and desire to secure by Letters Patent is:

1. A method of etching a surface of a metal object to obtain an etch pattern having a plurality of etch depths, including: applying a coat of light sensitive composition to the entire object surface; exposing to light all of the composition except that which coats at least one first designated surface region so as to fix a first etch resistant coating on the object surface; removing the unexposed composition from the object surface so that the first designated surface region remains uncoated; subjecting the surface to the action of an etching solution to etch the first designated surface region and thereby provide a first pattern part; removing the first etch resistant coating from the object surface; applying an etch resistant paint to the entire object surface; drying the etch resistant paint on the object surface so as to provide a second etch resistant coating; removing the second etch resistant coating on at least one second designated region of the object surface; and, subjecting the surface to the action of an etching solution to etch the second designated surface region and thereby provide a second pattern part; at least one of each of the first and second designated surface regions overlapping each other so that the surface is double etched within those regions.

2. A method as claimed in claim 1, wherein the etch-resistant paint is manually painted onto the surface, and the second etch-resistant coating is scratched from the second designated region of the object surface.

3. A method as claimed in claim 1, wherein the light sensitive composition is a photographic emulsion, and the first designated surface region to be etched is photographed onto the surface so that the emulsion coating that first designated surface region remains unexposed, and the unexposed emulsion is removed by washing the surface in a photographic developer solution.

4. A method as claimed in claim 1, wherein the metal object is a die part and the etch pattern is a negative of subject matter applied to a surface of an article during its production using the die part.

5. A method as claimed in claim 1, wherein the first designated surface region is etched to a depth of at least about 0.030 inches.

6. A method as claimed in claim 1, wherein the second designated surface region is etched to a depth of up to about 0.010 inches.

7. A method as claimaed in claim 1, wherein the first designated surface region is etched by immersing the surface in a bath of etching solution containing nitric acid in an active amount of about 14% by volume of the solution.

8. A method as claimed in claim 1, wherein the second designated surface region is etched by immersing the surface in a bath of etching solution containing nitric acid in an active amount of about 6% by volume of the solution.

* * * * *